United States Patent
Washizu et al.

(10) Patent No.: US 12,474,237 B2
(45) Date of Patent: Nov. 18, 2025

(54) FIRE DETECTION APPARATUS

(71) Applicant: HOCHIK I Corporation, Tokyo (JP)

(72) Inventors: Keisuke Washizu, Tokyo (JP); Hiroki Masuzawa, Tokyo (JP)

(73) Assignee: HOCHIKI CORPORATION, Tokyo (JP)

( * ) Notice: Subject to any disclaimer, the term of this patent is extended or adjusted under 35 U.S.C. 154(b) by 275 days.

(21) Appl. No.: 18/453,592

(22) Filed: Aug. 22, 2023

(65) Prior Publication Data

US 2023/0393035 A1 Dec. 7, 2023

Related U.S. Application Data

(63) Continuation-in-part of application No. PCT/JP2022/005633, filed on Feb. 14, 2022.

(51) Int. Cl.
*G01N 1/22* (2006.01)
*G08B 17/107* (2006.01)
*G08B 17/113* (2006.01)

(52) U.S. Cl.
CPC ......... *G01N 1/2273* (2013.01); *G01N 1/2202* (2013.01)

(58) Field of Classification Search
CPC .. G01N 1/2273; G01N 1/2202; G08B 17/113; G08B 17/107
See application file for complete search history.

(56) References Cited

U.S. PATENT DOCUMENTS

| | | |
|---|---|---|
| 4,099,065 A | 7/1978 | Malinowski |
| 4,851,819 A * | 7/1989 | Kawai .................. G08B 17/113 340/630 |

(Continued)

FOREIGN PATENT DOCUMENTS

| | | |
|---|---|---|
| CN | 112368752 A | 2/2021 |
| JP | 07-121785 A | 5/1995 |
| JP | 2008-242634 A | 10/2008 |
| JP | 2010-238095 A | 10/2010 |
| JP | 2019046112 A | 3/2019 |

(Continued)

OTHER PUBLICATIONS

Extended European Search Report issued in Application Serial No. 22919305.7 on Oct. 18, 2024.

(Continued)

*Primary Examiner* — Laura Martin
*Assistant Examiner* — Anthony W Megna Fuentes
(74) *Attorney, Agent, or Firm* — Brian J. Colandreo; Jeffrey T. Placker; Holland & Knight LLP

(57) ABSTRACT

A sensor 100 is a fire detection apparatus attached to a ceiling surface 900, and includes an inflow space 400 provided inside the sensor 100, a detection space 300 for detecting a detection target, the detection space 300 being provided at a position on a ceiling surface 900 side of the inflow space 400 on the inside of the sensor 100, an inner cover 2 for housing the detection space 300, the inner cover 2 being capable of allowing gas containing the detection target to flow into and out of the detection space 300 through the inflow space 400, an outer cover 1 for housing the inner cover 2, the outer cover 1 being capable of allowing the gas to flow into and out of the inflow space 400, and a suppressor 15 provided in the inflow space 400 and formed integrally with the outer cover 1, the suppressor 15 being used to suppress inflow of moisture contained in the gas into the detection space 300.

3 Claims, 17 Drawing Sheets

(56) References Cited

U.S. PATENT DOCUMENTS

| | | | |
|---|---|---|---|
| 8,232,885 B2 * | 7/2012 | Hoshino | G08B 17/107 |
| | | | 340/630 |
| 2017/0169682 A1 | 6/2017 | Bressanutti et al. | |
| 2021/0018420 A1 * | 1/2021 | Washizu | G01N 15/06 |
| 2021/0041350 A1 | 2/2021 | Takano et al. | |

FOREIGN PATENT DOCUMENTS

| | | | |
|---|---|---|---|
| JP | 2020-013396 A | 1/2020 | |
| JP | 2020135780 A | 8/2020 | |

OTHER PUBLICATIONS

International Search Report and Written Opinion issued in Application Serial No. PCT/JP2022/005633 on Apr. 5, 2022.
European Office Action issued in related Application Serial No. 22919305.7 on Jul. 10, 2025.
Japanese Office Action issued in related Application Serial No. 2023-526051 on Sep. 9, 2025.

* cited by examiner

[Fig. 1]
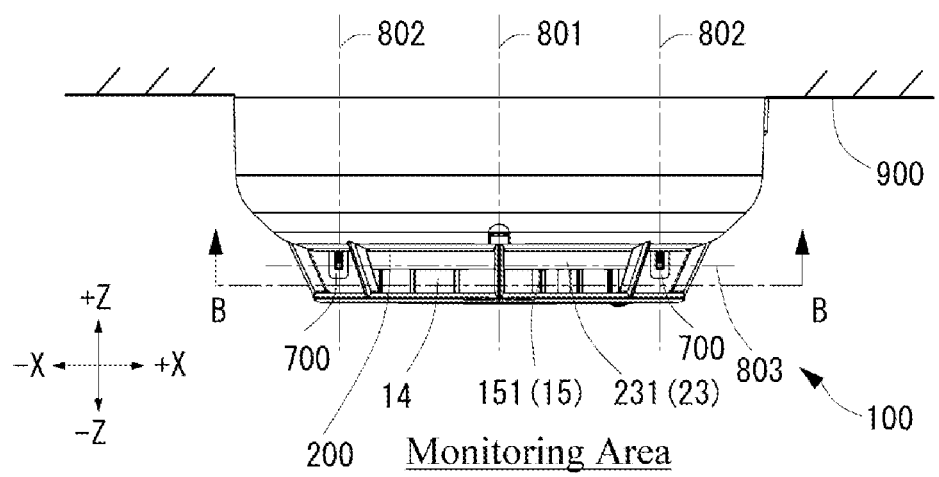
[Fig. 2]
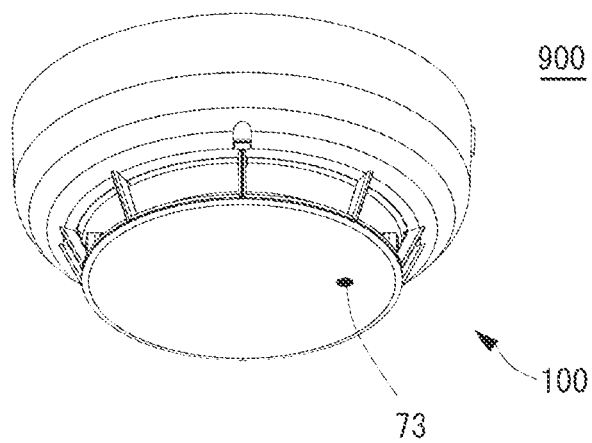

[Fig. 3]
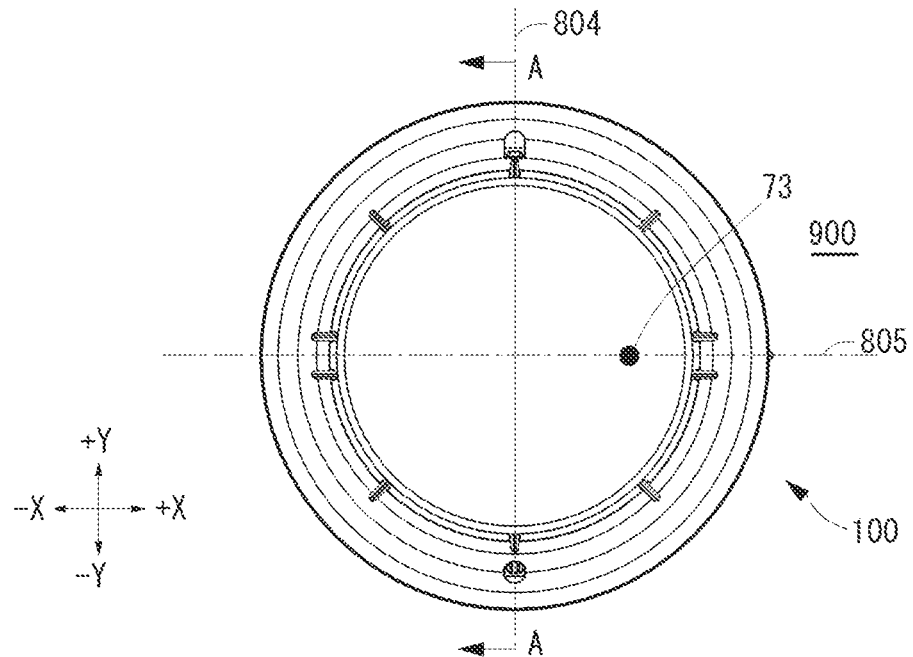
[Fig. 4]
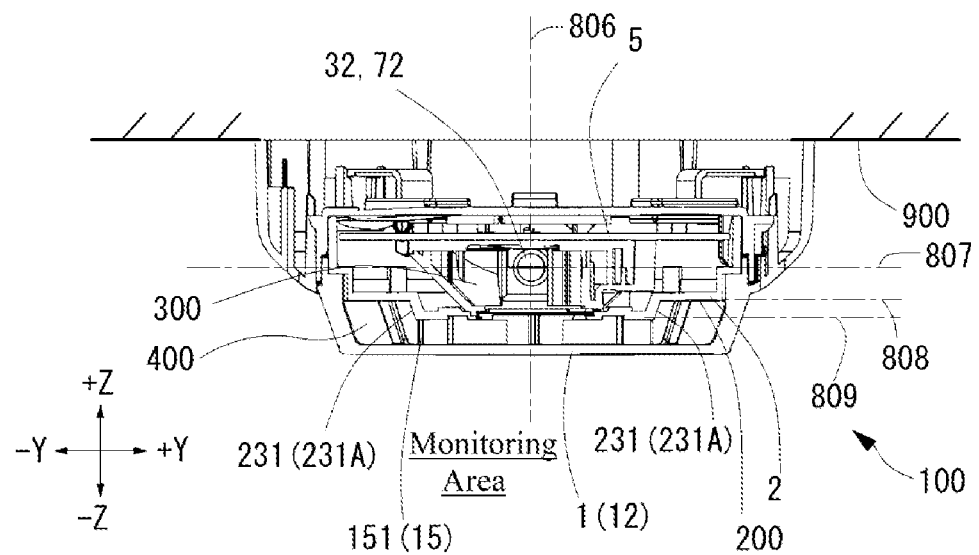

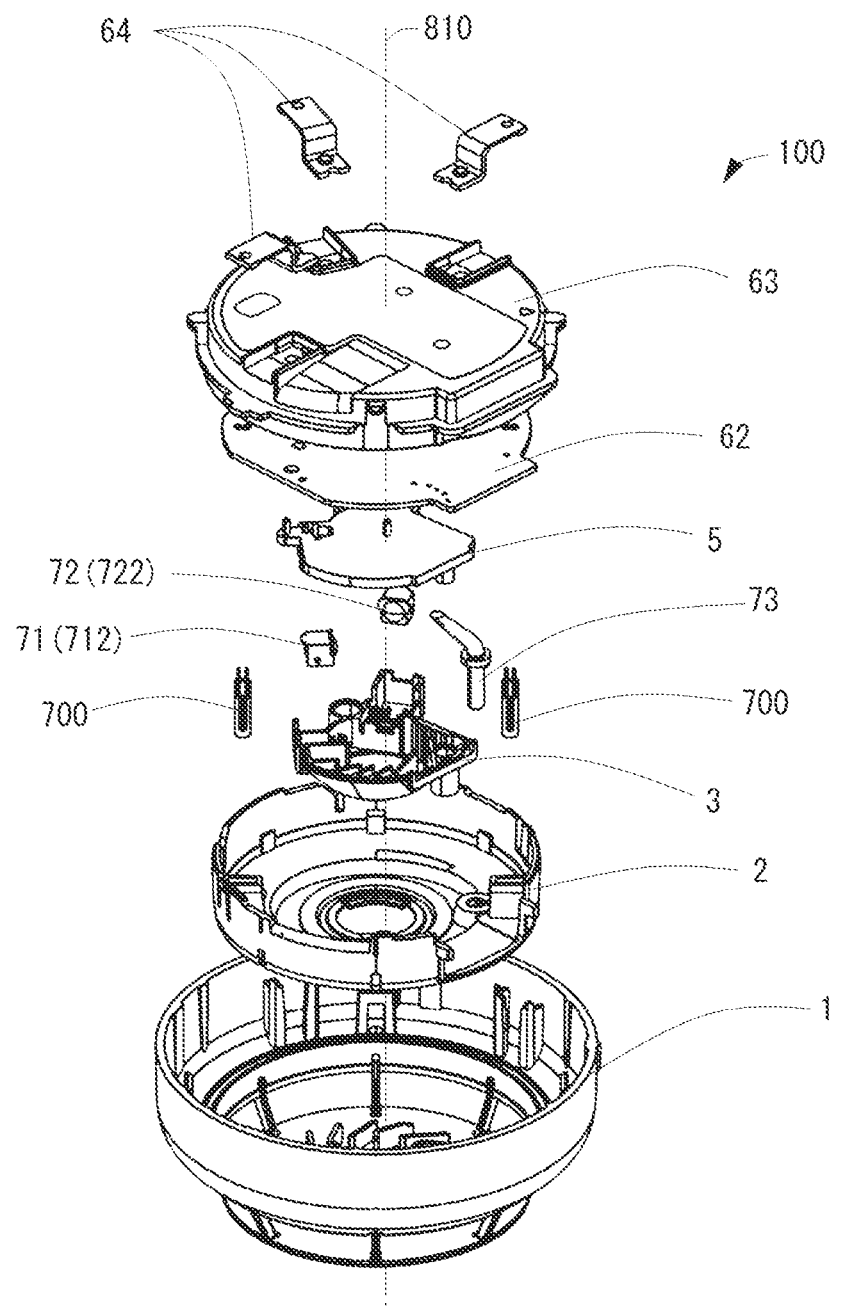
[Fig. 5]

[Fig. 6]
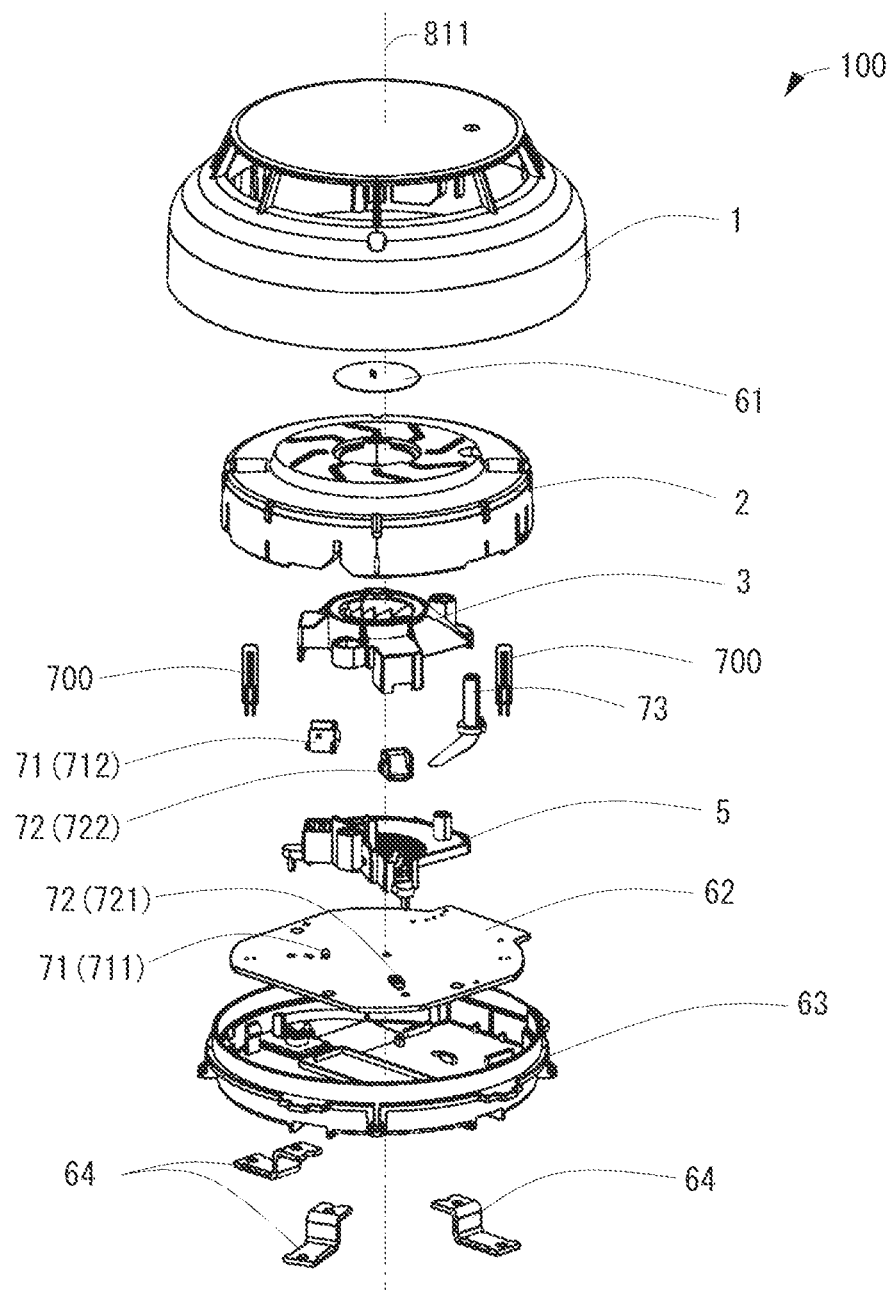

[Fig. 7]
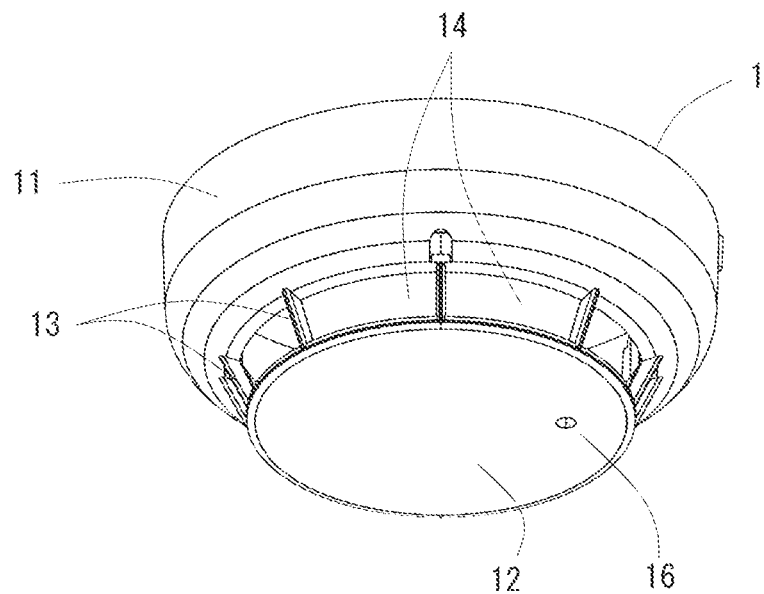
[Fig. 8]
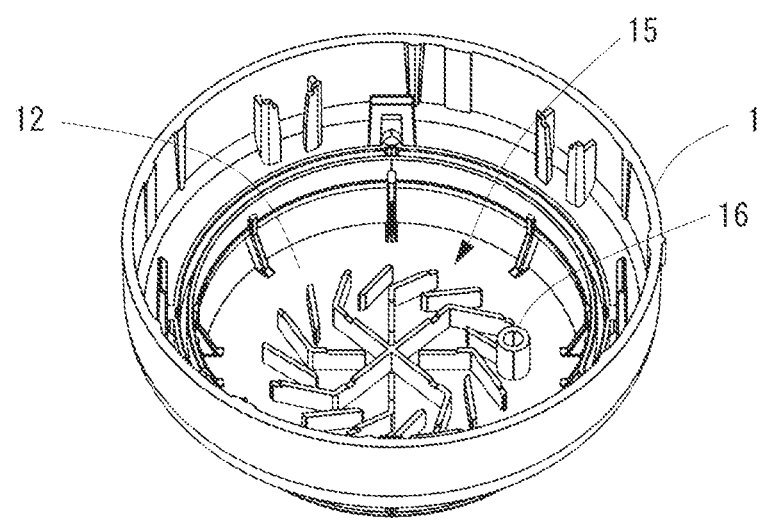

[Fig. 9]
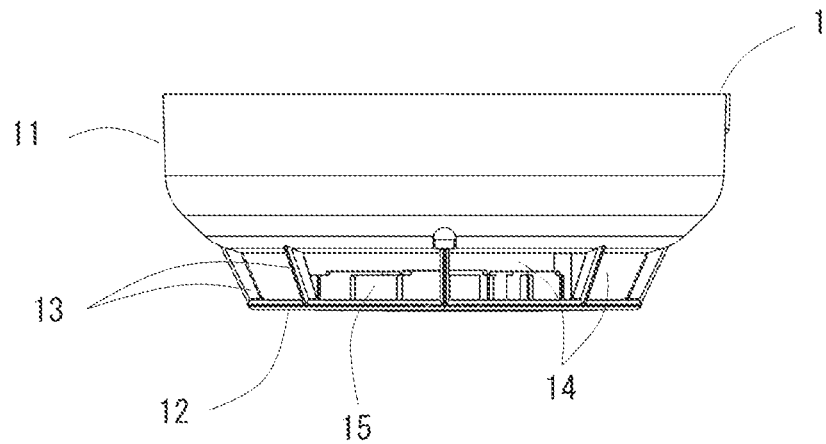
[Fig. 10]
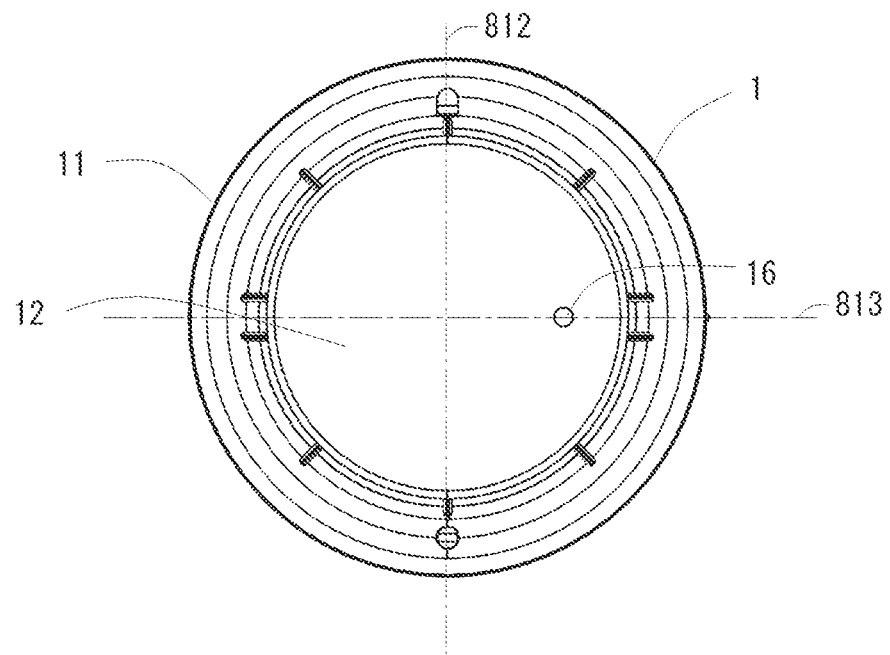

[Fig. 11]
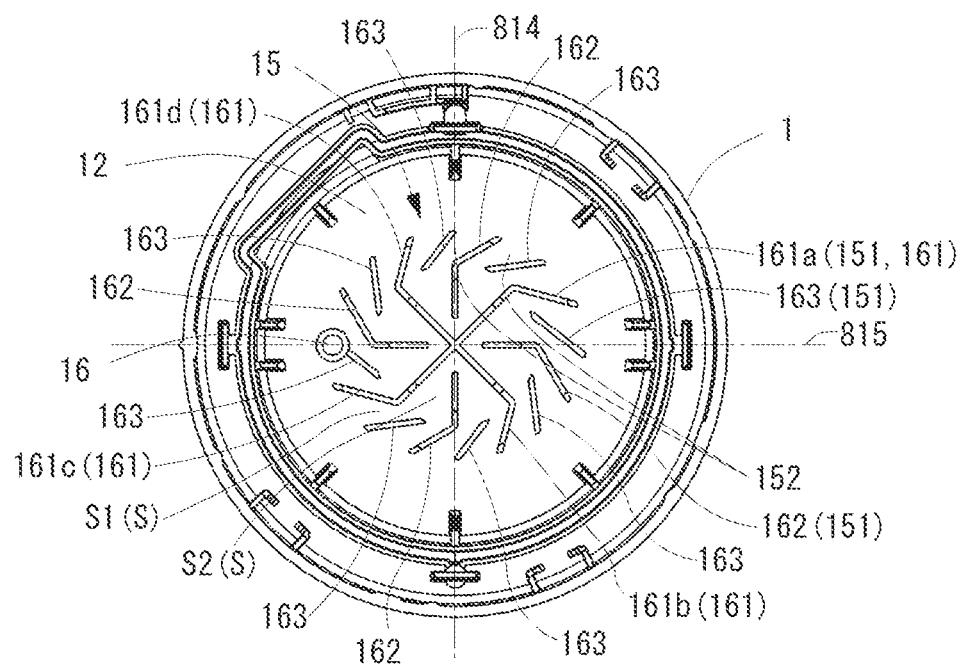
[Fig. 12]
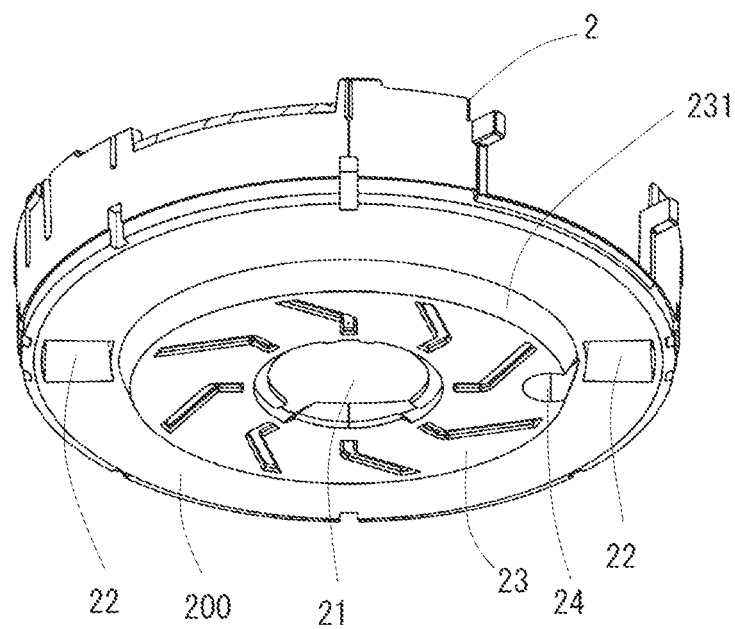

[Fig. 13]
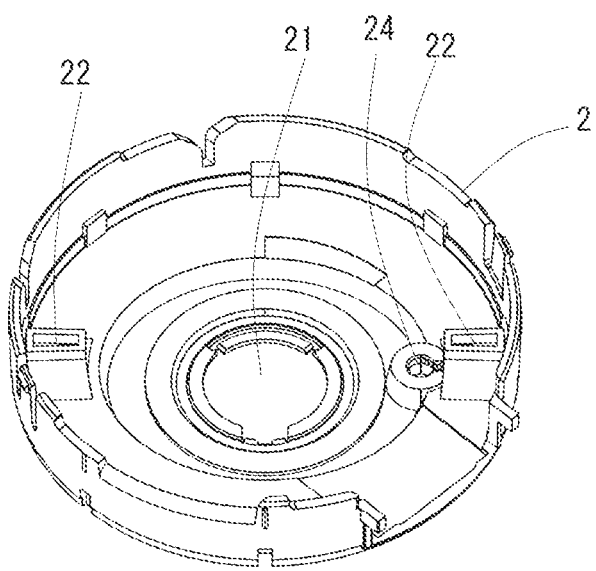
[Fig. 14]
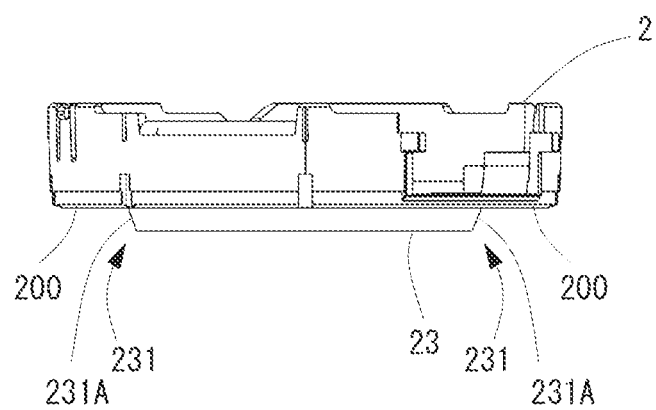

[Fig. 15]
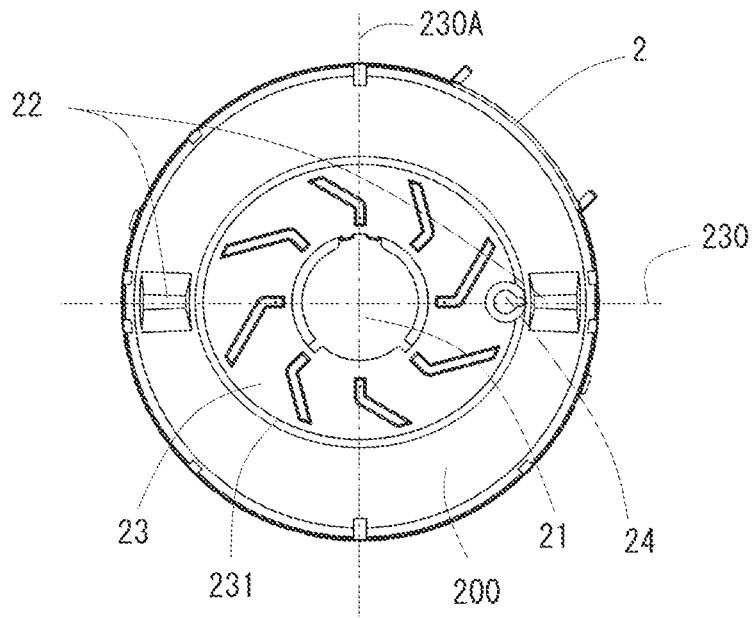
[Fig. 16]
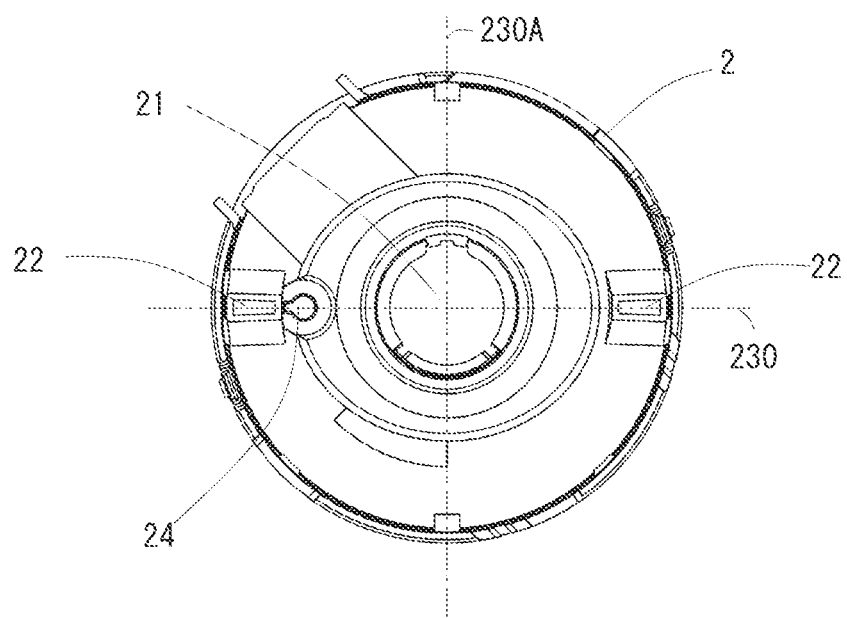

[Fig. 17]
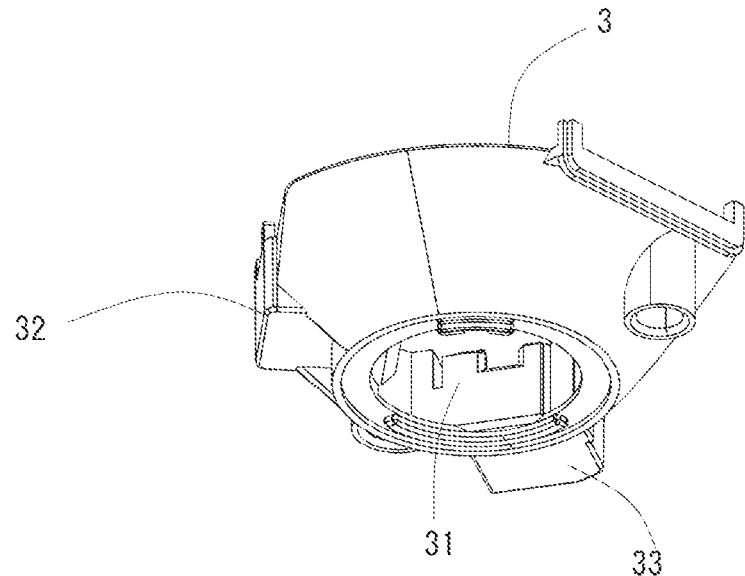
[Fig. 18]
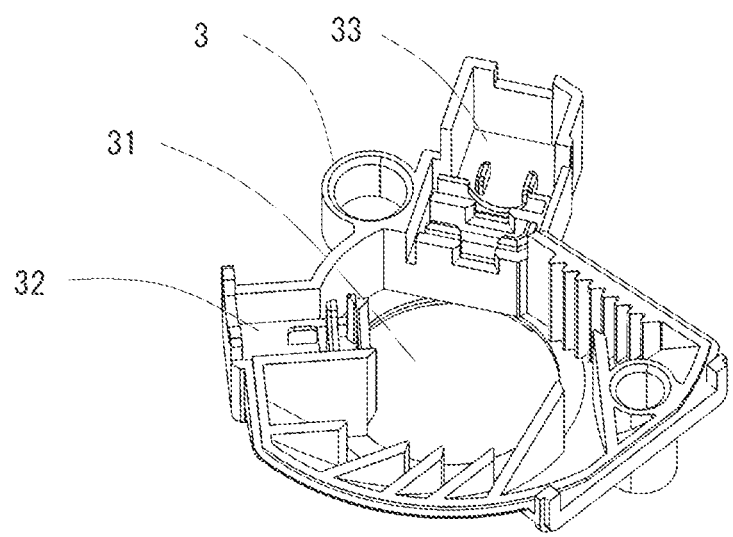

[Fig. 19]
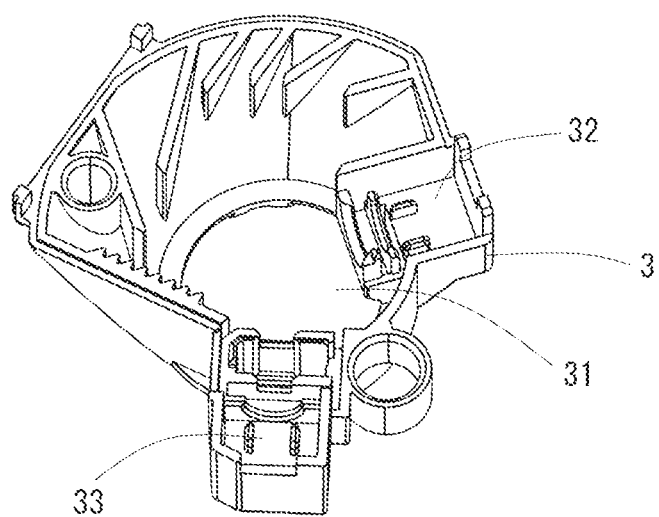
[Fig. 20]
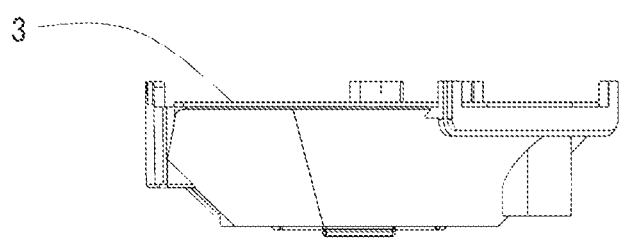

[Fig. 21]
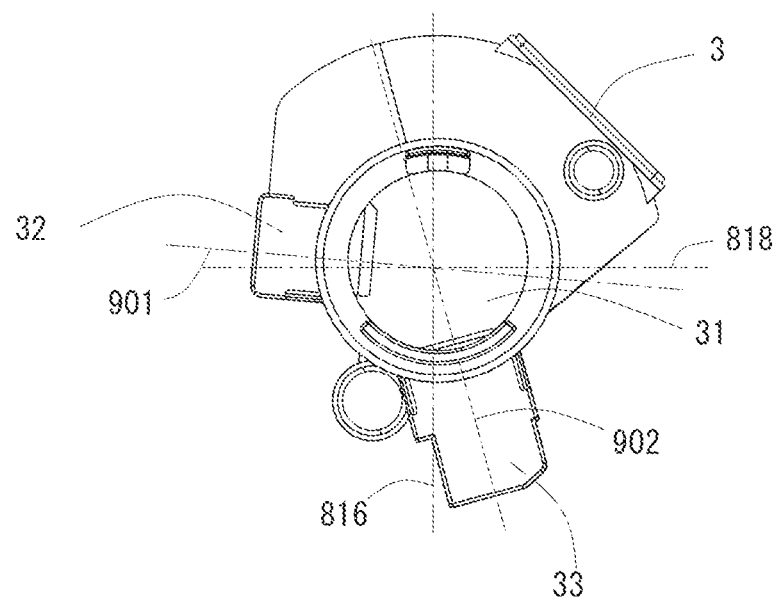
[Fig. 22]
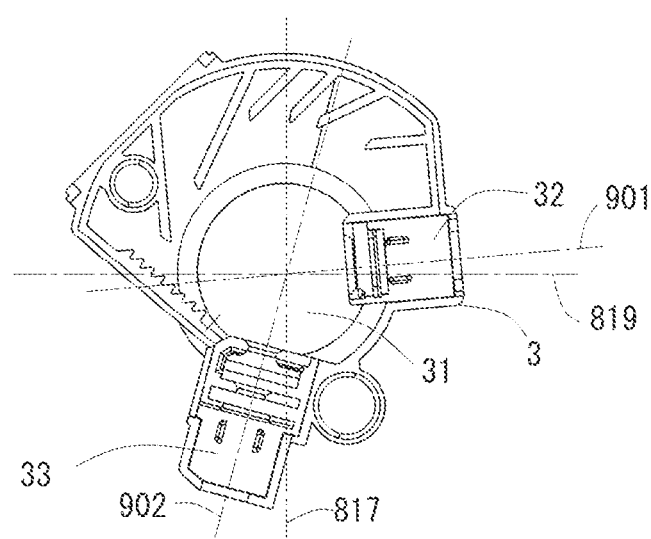

[Fig. 23]
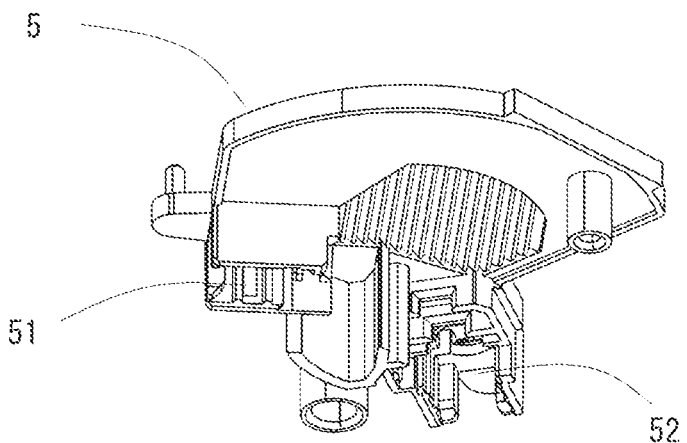
[Fig. 24]
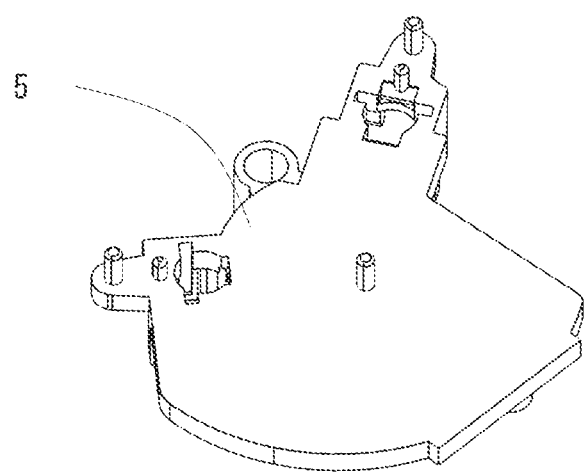

[Fig. 25]
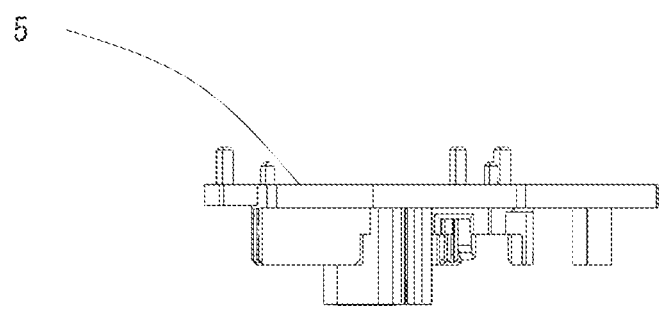
[Fig. 26]
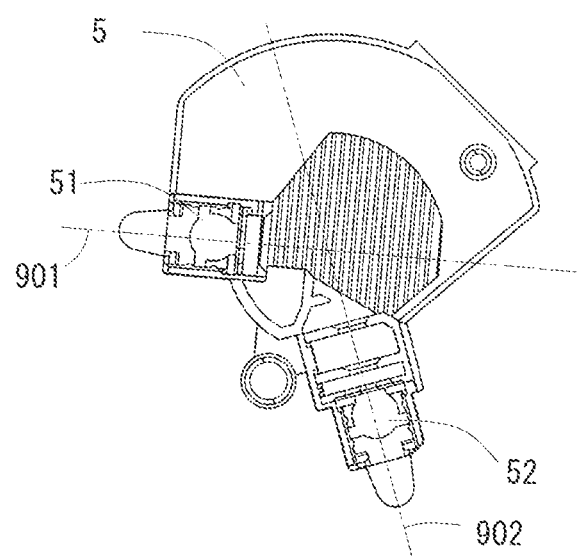

[Fig. 27]
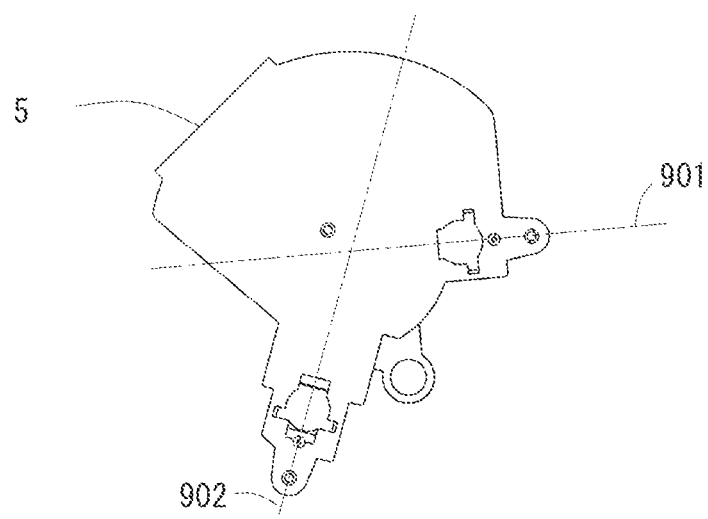
[Fig. 28]
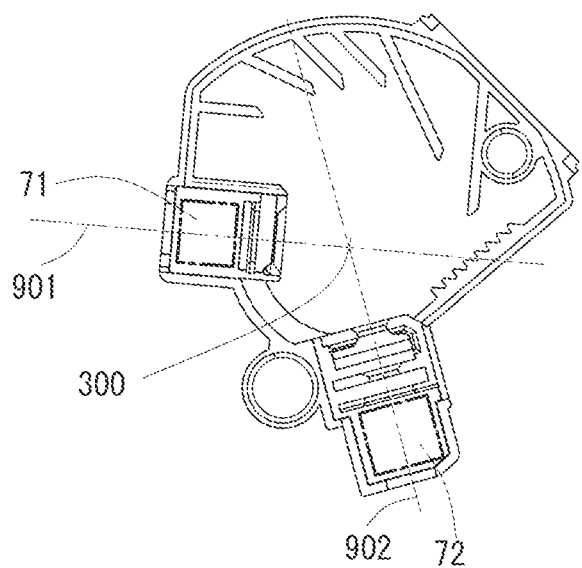

[Fig. 29]
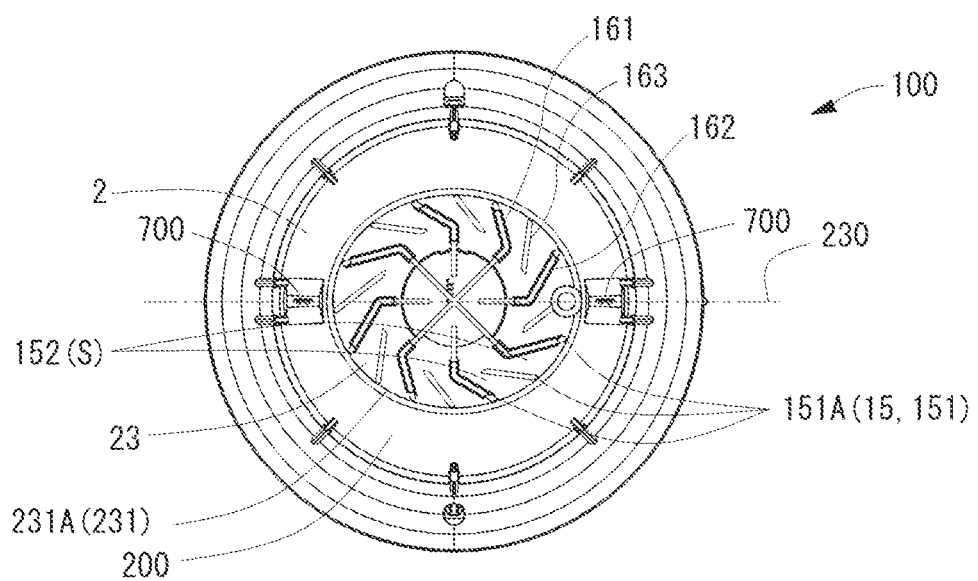
[Fig. 30]
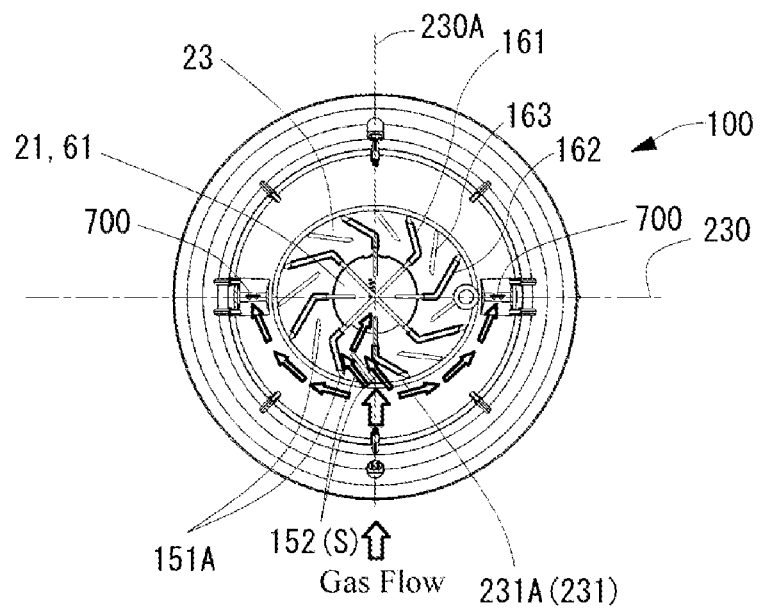

[Fig. 31]
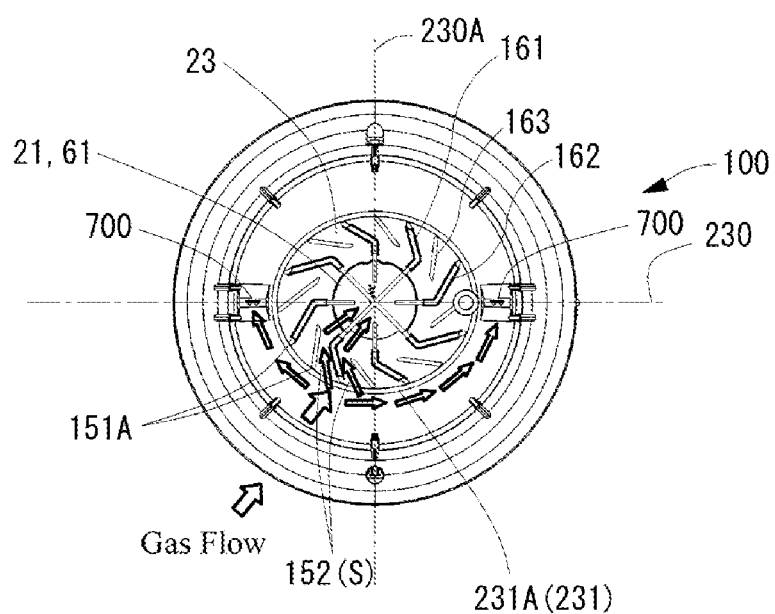

FIRE DETECTION APPARATUS

CROSS REFERENCE TO RELATED APPLICATIONS

This application is a Continuation-in-Part of PCT application No. PCT/JP2022/005633 filed on Feb. 14, 2022, the disclosure of which is incorporated by reference its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

TECHNICAL FIELD

The present invention relates to a fire detection apparatus.

BACKGROUND ART

Conventionally, a smoke sensor has been proposed to determine the presence or absence of a fire based on smoke density. Such a smoke sensor includes, for example, a detection space for detecting smoke, a smoke detector cover and a circuit board provided to surround the detection space, and an outer cover covering the smoke detector cover and the circuit board. The outer cover includes a main body and a guide portion for guiding an external gas to the detection space through openings provided in the main body and the smoke detector cover (for example, see Patent Document 1). In this way, an external gas containing smoke can be allowed to flow into the detection space, and the presence or absence of a fire can be determined based on the smoke density.

CITATION LIST

Patent Document

Patent Document 1: Laid-Open Patent Publication in Japan No. 2019-046112

SUMMARY OF THE INVENTION

Technical Problem

Here, in the conventional smoke sensor, as described above, the external gas is guided into the detection space by the guide portion through the openings provided in the main body and the smoke detector cover. Therefore, for example, when the gas contains a relatively large amount of moisture such as steam, the moisture easily flows into the detection space, and thus there is concern that smoke detection accuracy may be lowered. Therefore, there is room for improvement in terms of increasing moisture resistance of a fire detection apparatus such as a smoke sensor.

It is an object of the present invention to solve the problems of the above mentioned prior arts.

Solution to Problem

One aspect of the present invention provides a fire detection apparatus attached to a predetermined installation surface to detect a fire in a monitoring area, the fire detection apparatus comprises: an inflow space provided inside the fire detection apparatus, gas outside the fire detection apparatus being allowed to flow into the inflow space; a detection space for detecting a detection target, the detection space being provided at a position on an installation surface side of the inflow space on the inside of the fire detection apparatus; an inner housing section for housing the detection space, the inner housing section being capable of allowing the gas containing the detection target to flow into and out of the detection space through the inflow space; an outer housing section for housing the inner housing section, the outer housing section being capable of allowing the gas to flow into and out of the inflow space; and a suppression section provided in the inflow space and formed integrally with the outer housing section, the suppression section being used to suppress inflow of moisture contained in the gas into the detection space.

BRIEF DESCRIPTION OF THE DRAWINGS

FIG. 1 is a side view of a sensor according to an embodiment of the invention.
FIG. 2 is a perspective view of the sensor.
FIG. 3 is a front view of the sensor.
FIG. 4 is a cross-sectional view taken along line A-A of FIG. 3.
FIG. 5 is an exploded perspective view of the sensor.
FIG. 6 is an exploded perspective view of the sensor.
FIG. 7 is a perspective view of an outer cover.
FIG. 8 is a perspective view of the outer cover.
FIG. 9 is a side view of the outer cover.
FIG. 10 is a front view of the outer cover.
FIG. 11 is a rear view of the outer cover.
FIG. 12 is a perspective view of an inner cover.
FIG. 13 is a perspective view of the inner cover.
FIG. 14 is a side view of the inner cover.
FIG. 15 is a front view of the inner cover.
FIG. 16 is a rear view of the inner cover.
FIG. 17 is a perspective view of a smoke detector cover.
FIG. 18 is a perspective view of the smoke detector cover.
FIG. 19 is a perspective view of the smoke detector cover.
FIG. 20 is a side view of the smoke detector cover.
FIG. 21 is a front view of the smoke detector cover.
FIG. 22 is a rear view of the smoke detector cover.
FIG. 23 is a perspective view of a smoke detector base.
FIG. 24 is a perspective view of the smoke detector base.
FIG. 25 is a side view of the smoke detector base.
FIG. 26 is a front view of the smoke detector base.
FIG. 27 is a rear view of the smoke detector base.
FIG. 28 is a diagram illustrating an inside of a detection space.
FIG. 29 is a cross-sectional view taken along line B-B of FIG. 1.
FIG. 30 is a diagram illustrating an inflow state of gas, and is a diagram illustrating an area corresponding to FIG. 29.
FIG. 31 is a diagram illustrating an inflow state of gas, and is a diagram illustrating an area corresponding to FIG. 29.

MODE FOR CARRYING OUT THE INVENTION

An embodiment of a fire detection apparatus according to the invention will be described in detail below with reference to the accompanying drawings. However, the invention is not limited by this embodiment.

Basic Concept of Embodiment

First, a basic concept of the fire detection apparatus according to this embodiment will be described. The fire detection apparatus is an apparatus attached to a predetermined installation surface, and relates to an apparatus for detecting a fire in a monitoring area.

Here, in the embodiment, the "fire detection apparatus" is an apparatus that detects and reports a fire in the monitoring area based on a detection result of a detection target, and is a concept including, for example, an optical, electrical, and thermal fire sensor or fire alarm, etc.

In addition, the "predetermined installation surface" refers to a surface on which the fire detection apparatus is to be installed among surfaces of an installation object, and is a concept including, for example, a ceiling surface, a wall surface, a floor surface, etc. of a building. However, in the embodiment, a description will be given on the assumption that the predetermined installation surface is a ceiling surface of a room.

In addition, the "monitoring area" is an area to be monitored by the fire detection apparatus, and specifically is a concept indicating an indoor or outdoor area (for example, any space such as a room, a staircase, or a corridor). However, in the embodiment, a description will be given on the assumption that the monitoring area is a room.

Specific Content of Each Embodiment

Next, specific content of the embodiment will be described.
(Configuration)

First, a configuration of a sensor of the embodiment will be described. FIG. 1 is a side view of the sensor according to the embodiment of the invention, FIG. 2 is a perspective view of the sensor, FIG. 3 is a front view of the sensor, FIG. 4 is a cross-sectional view taken along line A-A of FIG. 3, and FIGS. 5 and 6 are exploded perspective views of the sensor. Note that in each figure, an element related to a feature of the application in a sensor 100 is illustrated and described by attaching a reference symbol thereto, and a similar configuration to that of a conventional sensor may be applied to an element other than the described element. In addition, in FIG. 4, hatching of a cross section is omitted for convenience of description (which is similarly applied to other cross sections).

Note that it is presumed that X-Y-Z axes of each figure are orthogonal to one another, a Z-axis indicates a vertical direction (that is, a longitudinal direction or a thickness direction in an installed state of the sensor 100), a −Z direction is referred to as a front side, and a +Z direction is referred to as a rear side. In addition, the X-axis and the Y-axis indicate a horizontal direction (that is, a transverse direction or a width direction in the installed state of the sensor 100). In addition, in an XY-plane of FIG. 3, a direction away from a center of the sensor 100 is referred to as an outer peripheral side, and a direction approaching the center is referred to as an inner side.

Note that a reference line 801 of FIG. 1 is a center line passing through the center of the sensor 100 and parallel to an upward/downward direction of the drawing, and is illustrated for convenience of description. Note that reference lines of other respective figures are illustrated for convenience of description. A reference line 802 of FIG. 1 is a center line passing through a center of a detection element 700 and parallel to the upward/downward direction of the drawing. A reference line 803 is a line indicating the same height position as a position of a protrusion 23 on a frontmost side (that is, the same height position as a position of a stepped portion 231 on a frontmost side).

A reference line 804 of FIG. 3 is a center line passing through the center of the sensor 100 and parallel to the upward/downward direction of the drawing, and a reference line 805 is a center line passing through the center of the sensor 100 and parallel to the left-right direction of the drawing.

A reference line 806 of FIG. 4 is a center line passing through a center of a light receiving portion 72 and parallel to the upward/downward direction of the drawing, and a reference line 807 is a center line passing through the center of the light receiving portion 72 and parallel to the left-right direction of the drawing. A reference line 808 of FIG. 4 is a line indicating the same height position as that of a base portion 200, and a reference line 809 is a line indicating the same height position as a frontmost position of a protrusion 23 (that is, the same height position as a frontmost position of the stepped portion 231).

Reference lines 810 and 811 of FIGS. 5 and 6 are center lines passing through the center of the sensor 100 and parallel to the upward/downward direction of the drawings.

The sensor 100 is the fire detection apparatus provided in the monitoring area, is, for example, an apparatus for detecting a fire in the monitoring area, and as illustrated in FIG. 1, is installed on a ceiling surface 900 (predetermined installation surface) of the room.

As illustrated in FIGS. 5 and 6, for example, the sensor 100 includes an outer cover 1, an inner cover 2, an inflow space 400, a detection space 300, a smoke detector cover 3, a smoke detector base 5, an insect screen 61 (FIG. 6), a board 62, a terminal board 63, an engaging metal fitting 64, a detection element 700, a light emitting portion 71, a light receiving portion 72, and a light guide 73.
(Configuration—Outer Cover)

FIGS. 7 and 8 are perspective views of the outer cover 1, FIG. 9 is a side view of the outer cover 1, FIG. 10 is a front view of the outer cover 1, and FIG. 11 is a rear view of the outer cover 1. Note that, in each figure, with regard to a plurality of similar components (for example, a connecting portion 13, an inlet 14, etc. of FIG. 9), for convenience of description, only some of the components will be described by attaching reference symbols thereto (which is similarly applied to other elements of other figures).

Note that reference lines 812 and 814 of FIGS. 10 and 11 are center lines passing through a center of the outer cover 1 and parallel to the upward/downward direction of the drawings, and reference lines 813 and 815 of FIGS. 10 and 11 are center lines passing through the center of the outer cover 1 and parallel to the left-right direction of the drawings.

The outer cover 1 is an outer housing section for housing the inner cover 2, and is an outer housing section capable of allowing gas containing the detection target (hereinafter simply referred to as "gas") to flow into and out of the inflow space 400.

Here, the "detection target" is a target detected by the sensor 100, specifically is a target generated due to a fire in the monitoring area, and is, for example, a concept including smoke particles, etc. generated due to a fire.

For example, the outer cover 1 is made of resin. For example, the outer cover 1 includes a main body 11, a top surface portion 12, a connecting portion 13, an inlet 14, a suppressor 15, and a light guide opening 16 of FIG. 9.
(Configuration—Outer Cover—Main Body)

The main body 11 is a main body of an outer housing section, which is a basic structure of the outer cover 1. The main body 11 is formed in a hollow shape, and specifically is formed in a substantially cylindrical shape having a predetermined diameter as illustrated in FIGS. 7 and 8.

(Configuration—Outer Cover—Top Surface Portion)

The top surface portion 12 is a partitioning section for partitioning the inflow space 400. The top surface portion 12 is formed of, for example, a substantially circular plate-shaped body (as an example, a circular plate-shaped body having a diameter smaller than that of an outer circumference of the main body 11, etc.), and is provided substantially horizontally at a position on the opposite side from the ceiling surface 900 side (the front side in FIG. 10) with respect to the main body 11 and the inflow space 400 as illustrated in FIGS. 7, 9, and 10.

(Configuration—Outer Cover—Connecting Portion)

The connecting portion 13 is a portion that connects the main body 11 and the top surface portion 12 to each other, and is, for example, a portion extending between the main body 11 and the top surface portion 12 as illustrated in FIG. 9.

(Configuration—Outer Cover—Inlet)

The inlet 14 is an opening for allowing gas to flow into the sensor 100 and allowing the gas to flow out from the inside of the sensor 100. The inlet 14 is formed in a gap between the main body 11 and the top surface portion 12, and is divided into a plurality of sections by a plurality of connecting portions 13 (that is, a plurality of inlets 14 is provided).

(Configuration—Outer Cover—Suppressor)

The suppressor 15 is a control section for suppressing moisture (for example, steam, etc.) contained in gas from flowing into the detection space 300. Note that details of a configuration of the suppressor 15 will be described later.

(Configuration—Outer Cover—Light Guide Opening)

The light guide opening 16 is a penetrating opening for exposing a tip of the light guide 73 (FIGS. 5 and 6) to the outside of the sensor 100.

(Configuration—Inner Cover)

FIGS. 12 and 13 are perspective views of the inner cover 2, FIG. 14 is a side view of the inner cover 2, FIG. 15 is a front view of the inner cover 2, and FIG. 16 is a rear view of the inner cover 2.

Note that a major axis 230 of FIGS. 15 and 16 indicates a major axis of an ellipse, which is a peripheral shape of the protrusion 23 (FIG. 15), and indicates a center line passing through a center of the inner cover 2 and parallel to the left-right direction of the drawings. A minor axis 230A of FIGS. 15 and 16 indicates a minor axis of the ellipse, which is the peripheral shape of the protrusion 23 (FIG. 15), and indicates a center line passing through the center of the inner cover 2 and parallel to the upward/downward direction of the drawings.

The inner cover 2 is an inner housing section for housing the detection space 300, and is an inner housing section capable of allowing gas containing the detection target to flow into and out of the detection space 300 through the inflow space 400. The inner cover 2 has a circular shape in a front view, and is, for example, made of resin. For example, the inner cover 2 has a first opening 21, a second opening 22, the protrusion 23, and a light guide opening 24 of FIG. 12.

(Configuration—Inner Cover—First Opening)

The first opening 21 is an opening for allowing gas to flow into the detection space 300 and allowing the gas to flow out from the inside of the detection space 300. As illustrated in FIG. 15, for example, the first opening 21 is a circular opening provided at the center of the inner cover 2 in a front view.

(Configuration—Inner Cover—Second Opening)

The second opening 22 is an opening which the detection element 700 is inserted through and is disposed in. As illustrated in FIG. 15, for example, the second opening 22 is a rectangular opening having an elliptical shape in a front view and provided on each of both sides of the protrusion 23 on the major axis 230 of the protrusion 23 (the major axis of the ellipse which is a peripheral shape of the outer peripheral wall 231A in the front view).

(Configuration—Inner Cover—Protrusion)

The protrusion 23 is a portion of the inner cover 2 protruding from the base portion 200 (FIGS. 12, 14, and 15) toward the front side. As illustrated in FIG. 15, for example, the protrusion 23 has an elliptical shape in the front view and has the stepped portion 231.

The stepped portion 231 is a part of the protrusion 23 and is a portion that protrudes and rises with respect to the base portion 200.

(Configuration—Inner Cover—Light Guide Opening)

The light guide opening 24 is an opening which the light guide 73 (FIGS. 5 and 6) is inserted through and is disposed in.

(Configuration—Inflow Space)

The inflow space 400 is a space into which gas outside the sensor 100 can flow. The inflow space 400 is provided inside the sensor 100, and specifically is provided in a space between the top surface portion 12 and the inner cover 2 in an inner space of the outer cover 1 as illustrated in FIG. 4.

(Configuration—Detection Space)

The detection space 300 is a space for detecting the detection target. The detection space 300 is provided at a position on the ceiling surface 900 side of the inflow space 400 in the sensor 100, and specifically is provided in a space surrounded by the smoke detector cover 3 and the smoke detector base 5 in an internal space of the inner cover 2 as illustrated in FIG. 4.

(Configuration—Smoke Detector Cover)

FIGS. 17 to 19 are perspective views of the smoke detector cover 3, FIG. 20 is a side view of the smoke detector cover 3, FIG. 21 is a front view of the smoke detector cover 3, and FIG. 22 is a rear view of the smoke detector cover 3.

The smoke detector cover 3 covers the detection space 300 (FIG. 4), a light emitting-side optical element 712 (FIGS. 5 and 6), and the light receiving-side optical element 722 together with the smoke detector base 5, that is, partitions the inside and outside of the detection space 300. For example, the smoke detector cover 3 is made of resin. As illustrated in FIGS. 17 to 19, for example, the smoke detector cover 3 includes an opening 31, a light emitting-side housing 32, and a light receiving-side housing 33.

(Configuration—Smoke Detector Cover—Opening)

The opening 31 is an opening for allowing gas to flow into the detection space 300 and allowing the gas to flow out from the inside of the detection space 300. As illustrated in FIG. 21, for example, the opening 31 is a circular opening and has substantially the same diameter as that of the first opening 21 of the inner cover 2.

(Configuration—Smoke Detector Cover—Each Housing)

The light emitting-side housing 32 is a portion that houses the light emitting-side optical element 712 (FIGS. 5 and 6).

The light receiving-side housing 33 is a portion that houses the light receiving-side optical element 722 (FIGS. 5 and 6).

(Configuration—Smoke Detector Base)

FIGS. 23 and 24 are perspective views of the smoke detector base 5, FIG. 25 is a side view of the smoke detector base 5, FIG. 26 is a front view of the smoke detector base and FIG. 27 is a rear view of the smoke detector base 5.

Note that a reference line 816 of FIG. 21 is a center line passing through a center of the smoke detector cover 3 and parallel to the upward/downward direction of the drawing, and a reference line 818 is a center line orthogonal thereto. An optical axis 901 indicates an optical axis of the light emitting portion 71 (FIG. 28) in the sensor 100 in an assembled state. An optical axis 902 indicates an optical axis of the light receiving portion 72 (FIG. 28) in the sensor 100 in the assembled state. A reference line 817 of FIG. 22 is a center line passing through the center of the smoke detector cover 3 and parallel to the upward/downward direction of the drawing, and a reference line 819 is a center line orthogonal thereto.

The smoke detector base 5 covers the detection space 300 (FIG. 4), the light emitting-side optical element 712 (FIGS. 5 and 6), and the light receiving-side optical element 722 together with the smoke detector cover 3, that is, partitions the inside and outside of the detection space 300. For example, the smoke detector base 5 is made of resin. For example, the smoke detector base 5 has a flat plate shape as a whole, and includes a light emitting-side housing 51 (FIGS. 23 and 26) and a light receiving-side housing 52.

(Configuration—Smoke Detector Base—Each Housing)

The light emitting-side housing 51 is a portion for housing the light emitting-side optical element 712 (FIGS. 5 and 6), and is a portion provided at a position corresponding to the light emitting-side housing 32 of the smoke detector cover 3 in the sensor 100 in the assembled state.

The light receiving-side housing 52 is a portion for housing the light receiving-side optical element 722 (FIGS. 5 and 6), and is a portion provided at a position corresponding to the light receiving-side housing 33 of the smoke detector cover 3 in the sensor 100 in the assembled state.

(Configuration—Insect Screen)

The insect screen 61 of FIG. 6 is used to prevent insects from entering the detection space 300 while allowing gas to flow into or out of the detection space 300 (FIG. 4). For example, the insect screen 61 is a circular one provided in the first opening 21 of the inner cover 2, and is provided with a plurality of small holes (not illustrated) having such a predetermined diameter that the small holes allow inflow or outflow of the gas and can prevent entry of insects.

(Configuration—Board)

The board 62 of FIGS. 5 and 6 is a circuit board on which an electric circuit including various elements, an IC, electric wiring, etc. is mounted. As illustrated in FIG. 6, for example, a light emitting element 711 and a light receiving element 721 are mounted on a surface of the board 62 on the front side. Further, the detection element 700 is mounted on the board 62 in addition to each of these elements.

(Configuration—Terminal Board)

The terminal board 63 of FIGS. 5 and 6 covers elements (the smoke detector cover 3, etc.) of the sensor 100 from the rear side. The terminal board 63 is attached to the ceiling surface 900 via the engaging metal fitting 64, that is, is an attachment portion for attaching the sensor 100 to the ceiling surface 900.

(Configuration—Engaging Metal Fitting)

The engaging metal fitting 64 is detachably attached to the terminal board 63 and an attachment structure on the ceiling surface 900 side (for example, a structure fit to or engaged with the engaging metal fitting 64 to fix and attach the engaging metal fitting 64). By using the engaging metal fitting 64, the sensor 100 including the terminal board 63 can be attached to the ceiling surface 900. Note that the engaging metal fitting 64 may be construed as corresponding to the "attachment portion".

In addition, in the embodiment, although not illustrated, it is assumed that the sensor 100 is attached to the ceiling surface 900 using an attachment base that is a circular plate-shaped member having approximately the same diameter as that of the terminal board 63. However, when this attachment base is used, the attachment base may be construed as corresponding to the "attachment portion". Note that the "attachment base" is a member provided between the sensor 100 and the ceiling surface 900 to install and attach the sensor 100 on and to the ceiling surface 900, and a detailed description thereof will be omitted since a known configuration can be applied.

(Configuration—Detection Element)

The detection element 700 of FIGS. 5 and 6 is a heat detection element that detects heat of gas flowing into the inflow space 400.

The detection element 700 can be configured using, for example, a thermistor, etc. that detects a temperature corresponding to heat and outputs temperature information indicating the detected temperature. The detection element 700 is mounted on the board 62, and is provided so that a part of the detection element 700 protrudes to the front side of the inner cover 2 while being inserted into the second opening 22 of the inner cover 2 of FIG. 12. Note that the detection element 700 does not have to be mounted, and is used as a sensor for both smoke and heat when mounted, and as a sensor for smoke alone when not mounted.

(Configuration—Light Emitting Portion)

FIG. 28 is a diagram illustrating the inside of the detection space 300. Note that FIG. 28 illustrates a state in which the inside of the smoke detector cover 3 is viewed from the front side in the sensor 100 in the assembled state, and illustration of a detailed structure of the smoke detector base 5 is omitted for convenience of description.

The light emitting portion 71 of FIG. 28 is a light emitting section that emits emission light for detecting smoke particles, which are detection targets, into the detection space 300. As illustrated in FIGS. 5 and 6, for example, the light emitting portion 71 includes the light emitting element 711 and the light emitting-side optical element 712.

(Configuration—Light Emitting Portion—Light Emitting Element)

The light emitting element 711 is an element that emits light (emission light), and may be configured using, for example, a light emitting diode (LED). The light emitting element 711 is mounted on the board 62.

(Configuration—Light Emitting Portion—Light Emitting-Side Optical Element)

The light emitting-side optical element 712 is an element that guides and emits emission light emitted by the light emitting element 711 into the detection space 300, and may be configured using, for example, a prism. For example, the light emitting-side optical element 712 is housed in the smoke detector cover 3 and the smoke detector base 5.

For example, the light emitting-side optical element 712 is configured to emit light from the light emitting element 711 mainly in a direction parallel to the smoke detector base 5 (that is, a direction parallel to the XY-plane of FIG. 3).

(Configuration—Light Receiving Portion)

The light receiving portion 72 of FIG. 28 is a light receiving section that receives scattered light, etc. generated by emission light scattered by the smoke particles, which are detection targets in the detection space 300. As illustrated in FIGS. 5 and 6, for example, the light receiving portion 72 includes the light receiving element 721 and the light receiving-side optical element 722.

(Configuration—Light Receiving Portion—Light Receiving Element)

The light receiving element 721 is an element that receives light (scattered light, etc.), and may be configured using, for example, a photodiode. The light receiving element 721 is mounted on the board 62.

(Configuration—Light Receiving Portion—Light Receiving-Side Optical Element)

The light receiving-side optical element 722 is an element that guides light in the detection space 300 to the light receiving element 721, and may be configured using, for example, a prism. The light receiving-side optical element 722 is housed in the smoke detector cover 3 and the smoke detector base 5.

The light receiving-side optical element 722 is configured to guide scattered light, etc. scattered by the smoke particles and entering the light receiving-side optical element 722 to the light receiving element 721.

(Configuration—Light Guide)

The light guide 73 of FIGS. 5 and 6 is an element that functions as an indicator light of the sensor 100, and as illustrated in FIGS. 2 and 3, for example, a part thereof is exposed on the front side of the sensor 100. For example, on the assumption that a light emitting element (LED) different from the light emitting-side optical element 712 is provided on the surface of the board 62 on the front side, the light guide 73 is an element that guides light from this light emitting element and outputs the light to the front side of the sensor 100. The "indicator light" is an element that displays a state of the sensor 100. For example, the indicator light outputs light of a color (for example, green or red) according to the state of the sensor 100 to display the state of the sensor 100.

(Configuration—Others—Gas Sensor)

In addition to the above configuration, a gas sensor (for example, a CO gas sensor) that detects fire gas may be mounted.

(Configuration—Details of Configuration of Suppressor)

Next, details of a configuration of the suppressor 15 will be described. FIG. 29 is a cross-sectional view taken along line B-B of FIG. 1.

Features of the suppressor 15 are as follows in the embodiment. However, the suppressor 15 may be manufactured in any shape, using any method, and using any material, unless otherwise specified.

(Configuration—Details of Configuration of Suppressor—First Feature)

As for a first feature of a configuration of the suppressor 15, the suppressor 15 is provided in the inflow space 400 and is formed integrally with the outer cover 1.

Here, for example, "integrally formed" is a concept including that the suppressor 15 and the top surface portion 12 are formed of one member, and that the suppressor 15 and the top surface portion 12 are configured so that mutual heat transfer is allowed to an extent comparable to the case where the suppressor 15 and the top surface portion 12 are formed of one member by bringing the suppressor 15 and the top surface portion 12 into close contact with each other (for example, the suppressor 15 is formed separately from the top surface portion 12 and then fixed thereto using an adhesive, etc.). However, in the embodiment, a description will be given on the assumption that the suppressor 15 and the top surface portion 12 are formed of one member using the same resin material.

Specifically, as illustrated in FIGS. 1, 4, 8, 11, and 29, the suppressor 15 has a plurality of walls 151 provided to partition the inflow space 400, and the plurality of walls 151 is formed integrally with the top surface portion 12 of the outer cover 1, and is provided to protrude from the top surface portion 12 toward the rear side (more specifically, the plurality of walls 151 is erected and disposed to come into contact with the protrusion 23).

According to the first feature, the suppressor 15 provided in the inflow space 400 different in height position from the detection space 300 can effectively suppress inflow of moisture into the detection space 300, and improve moisture resistance of the sensor 100. In addition, when compared with the case where the suppressor 15 is provided separately from the outer cover 1, it is possible to improve an attaching property of the suppressor 15. Further, when a size of the outer cover 1 is larger than that of another member, a heat capacity of the suppressor 15 can be increased, and thus a moisture permeation prevention property of the sensor 100 can be enhanced. In addition, when compared to the case where the suppressor 15 is formed integrally with the main body 11 of the outer cover 1, the suppressor 15 and the outer cover 1 can be more easily configured, and productivity of the suppressor 15 and the outer cover 1 can be improved.

(Configuration—Details of Configuration of Suppressor—Second Feature)

Next, with regard to a second feature of the configuration of the suppressor 15, the plurality of walls 151 includes a first wall 161, a second wall 162, and a third wall 163.

(Configuration—Details of Configuration of Suppressor—Second Feature—First Wall)

The first wall 161 is an intersection wall in which four walls 161a to 161d (hereinafter referred to as "first intersection wall 161a", "second intersection wall 161b", "third intersection wall 161c", and "fourth intersection wall 161d") intersect in a substantially cross shape, and is provided at least in a central portion of the inflow space 400.

Specifically, as illustrated in FIGS. 11 and 29, the first wall 161 is configured so that respective inner end portions of the first intersection wall 161a, the second intersection wall 161b, the third intersection wall 161c, and the fourth intersection wall 161d intersect each other, and respective outer end portions of the first intersection wall 161a, the second intersection wall 161b, the third intersection wall 161c, and the fourth intersection wall 161d are located at an outer edge of the stepped portion 231 or in the vicinity thereof. In addition, the first wall 161 is disposed so that respective side end portions 151A of the first intersection wall 161a, the second intersection wall 161b, the third intersection wall 161c, and the fourth intersection wall 161d is disposed along an outer periphery of the stepped portion 231 on the front side of the stepped portion 231.

In addition, a specific configuration of the first wall 161 is any configuration. However, in the embodiment, as illustrated in FIG. 11, each of the first intersection wall 161a, the second intersection wall 161b, the third intersection wall 161c, and the fourth intersection wall 161d is formed to have a substantially curved shape in a front view. In this way, gas flowing into the inflow space 400 is easily suppressed from flowing into the detection space 300 through the first opening 21 without coming into contact with the first intersection wall 161a, the second intersection wall 161b, the third intersection wall 161c, or the fourth intersection wall 161d.

(Configuration—Details of Configuration of Suppressor—Second Feature—Second Wall)

The second wall 162 is a wall provided between intersection walls of the first wall 161, and a plurality of second walls 162 is provided in the inflow space 400.

Specifically, as illustrated in FIGS. 11 and 29, one second wall 162 is provided in each of four spaces partitioned by adjacent intersection walls (that is, four second walls 162 are provided) in the inflow space 400. In addition, each second wall 162 is disposed so that a side end portion 151A of the second wall 162 extends along the outer periphery of the stepped portion 231 on the front side of the stepped portion 231.

In addition, a specific configuration of the second wall 162 is any configuration. However, in the embodiment, as illustrated in FIG. 11, the second wall 162 is formed to have a substantially curved shape in a front view. In this way, gas flowing into the inflow space 400 is easily suppressed from flowing into the detection space 300 through the first opening 21 without coming into contact with the second wall 162.

(Configuration—Details of Configuration of Suppressor—Second Feature—Third Wall)

The third wall 163 is a wall provided between an intersection wall of the first wall 161 and the second wall 162, and a plurality of third walls 163 is provided in the inflow space 400.

Specifically, as illustrated in FIGS. 11 and 29, one third wall 163 is provided in each of eight spaces partitioned by one of the first intersection wall 161a, the second intersection wall 161b, the third intersection wall 161c, or the fourth intersection wall 161d and the second wall 162 (that is eight third walls 163 are provided) in the inflow space 400. In addition, each third wall 163 is disposed so that a side end portion 151A of the third wall 163 extends along the outer periphery of the stepped portion 231 on the front side of the stepped portion 231.

In addition, a specific configuration of the third wall 163 is any configuration. However, in the embodiment, as illustrated in FIG. 11, the third wall 163 is formed to have a substantially linear shape in a front view. However, the invention is not limited thereto, for example, the third wall 163 may be formed in a shape other than the substantially linear shape (for example, a substantially curved shape, etc.) in the front view.

(Configuration—Details of Configuration of Suppressor—Second Feature—Other Configurations)

In addition, an installation method of a plurality of walls 151 (specifically, the first wall 161, the second wall 162, and the third wall 163) is any method. However, in the embodiment, the plurality of walls 151 is disposed to mutually have an interval therebetween so that a space (specifically, a space S described later) partitioned by a plurality of walls in the inflow space 400 has a labyrinth shape. In addition, at least some of the plurality of walls 151 are disposed in a radial shape from the central portion of the inflow space 400 toward the outside.

Here, the "labyrinth shape" means a shape in which the outer end portion to the inner end portion of the space partitioned by the plurality of walls 151 cannot be connected by a straight line.

Specifically, as illustrated in FIGS. 11 and 29, the first wall 161 is disposed so that each intersection wall has a radial shape by disposing an intersection of each intersection wall in the central portion of the inflow space 400. In addition, each second wall 162 is disposed to mutually have an interval between each second wall 162 and the first wall 161 and is disposed in a radial shape from the central portion of the inflow space 400 toward the outside. In addition, each third wall 163 is disposed between an outer portion of each intersection wall of the first wall 161 and an outer portion of the second wall 162, and is disposed at an inclination different from an inclination of the outer portion of each intersection wall and an inclination of the outer portion of the second wall 162 in a front view (that is, is disposed in a non-radial shape from the central portion of the inflow space 400 toward the outside).

By such installation, the space S of FIG. 11 obtained by combining a space S1 of FIG. 11 partitioned by each intersection wall of the first wall 161 or an outer portion of any one of the second walls 162 and the third wall 163 and a space S2 of FIG. 11 partitioned by each intersection wall of the first wall 161 or an inner portion of any one of the second walls 162 and each intersection wall of the first wall 161 or an inner portion of another one of the second walls 162 in the inflow space 400 can be formed in a labyrinth shape. Thus, moisture contained in gas flowing into the inflow space 400 can be effectively suppressed from flowing into the detection space 300. In addition, since a plurality of spaces S can be formed in a radial shape, it is possible to allow gas to flow into the detection space 300 from various directions while suppressing inflow of moisture into the detection space 300. In this way, it becomes easy to ensure detection accuracy of the detection target.

According to the second feature, a flow path (specifically, the space S) for allowing the detection target to flow into the detection space 300 from the outside of the apparatus can be ensured in the inflow space 400, and the first wall 161 can enhance stability when the suppressor 15 is attached. In addition, the first wall 161 can increase the heat capacity of the suppressor 15, suppress permeation of moisture in the central portion of the inflow space 400, and further enhance the moisture permeation prevention property.

(Configuration—Details of Configuration of Suppressor—Third Feature)

With regard to a third feature of the configuration of the suppressor 15, the plurality of inlets 14 and the plurality of walls 151 are configured so that a relative arrangement relationship between an inlet 14 and a wall 151 corresponding to the inlet 14 is the same for the plurality of inlets 14.

Specifically, the plurality of walls 151 is disposed so that the installation number of walls 151 installed to correspond to each inlet 14 is the same. More specifically, the plurality of walls 151 is disposed so that three walls 151 are seen when the inside of each inlet 14 is viewed from the outside of the sensor 100.

In this case, a method of setting the installation number of walls 151 is any method. However, in the embodiment, from a viewpoint of facilitating uniform gas inflow at each inlet 14, the installation number of walls 151 is set to be an integral multiple of the installation number of inlets 14. Specifically, when the installation number of inlets 14 is eight, the installation number of walls 151 is set to 16.

In addition, a method of setting sizes of the walls 151 and the inlets 14 is any method. However, in the embodiment, from a viewpoint of facilitating uniform gas inflow at each inlet 14, a length of a gap between adjacent walls 151 among the plurality of walls 151 (specifically, a length of the gap in a horizontal direction) is set to be substantially uniform, and a length of a width of each of the plurality of inlets 14 (specifically, a length of the inlet 14 in the horizontal direction) is set to be substantially uniform. Specifically, the length (maximum length) of the gap between the adjacent walls 151 is set to approximately ⅓ the length of the width of each of the plurality of inlets 14.

According to the third feature, the inflow of gas at each inlet 14 can be made uniform, and it is possible to suppress variations in the amount of gas inflow due to different inflow directions.

(Assembly Procedure for Sensor)

Next, a procedure for assembling the sensor 100 will be described. Here, an example of the procedure for assembling the sensor 100 will be described mainly with reference to FIGS. 5 and 6.

First, the light emitting-side optical element 712 and the light receiving-side optical element 722 are housed in the light emitting-side housing 51 (FIGS. 23 and 26) and the light receiving-side housing 52 of the smoke detector base 5.

Next, the smoke detector cover 3 is attached to the smoke detector base 5 using any method (for example, a method using an engagement structure provided in each element, etc.). In this case, the light emitting-side optical element 712 and the light receiving-side optical element 722 are also housed in the light emitting-side housing 32 (FIG. 19) and the light receiving-side housing 33 of the smoke detector cover 3.

Next, the board 62 on which the light emitting element 711, the light receiving element 721, and the detection element 700 are mounted is attached to the terminal board 63 from the front side of the terminal board 63 (the upper side of the drawing of FIG. 6) using any method (for example, a screwing method, etc.). In addition, the engaging metal fitting 64 is attached to the terminal board 63 from the rear side of the terminal board 63 (the lower side of the drawing of FIG. 6) using any method (for example, a screwing method, etc.).

Next, the smoke detector base 5 with the smoke detector cover 3 attached thereto is attached to the board 62 from the front side of the board 62 (the upper side of the drawing of FIG. 6) using any method (for example, a method of using an engagement structure provided in each element, a screwing method, etc.).

Next, the inner cover 2 is attached to the terminal board 63 from the front side of the terminal board 63 (the upper side of the drawing of FIG. 6) to which the smoke detector cover 3, etc. is attached using any method (for example, a method of using an engagement structure provided in each element, etc.). Note that, in this case, a part of the detection element 700 is inserted through the second opening 22 of the inner cover 2 and protrudes from the inner cover 2 toward the front side. In addition, the light guide 73 is inserted through the light guide opening 24 of the inner cover 2.

Next, the insect screen 61 is provided in the first opening 21 of the inner cover 2.

Next, the outer cover 1 is attached to the terminal board 63 from the front side (the upper side of the drawing of FIG. 6) of the terminal board 63 to which the inner cover 2, etc. is attached using any method (for example, a method using an engagement structure provided in each element, etc.). Note that, in this case, as illustrated in FIG. 1, the suppressor 15 comes into contact with the protrusion 23 of the inner cover 2. In addition, the insect screen 61 is pressed by the first wall 161 of the suppressor 15, so that the insect screen 61 is fixed to the sensor 100. In addition, the tip of the light guide 73 is exposed to the outside of the sensor 100 through the light guide opening 16 (FIG. 7) of the outer cover 1. In this way, assembly of the sensor 100 illustrated in FIGS. 1 to 4 is completed.

(Fire Detection Operation)

Next, a fire detection operation by the sensor 100 will be described.

For example, the sensor 100 performs an operation of detecting a fire based on the amount of light received by the light receiving portion 72 or the temperature of the gas detected by the detection element 700. Since a known operation may be applied as this operation, only an outline will be described. In addition, since two detection elements 700 are provided in the sensor 100, a detection result of one of the two detection elements 700 detecting a higher temperature is used.

(Fire Detection Operation—when No Fire is Detected)

For example, when there is no fire in the monitoring area, no gas containing smoke particles flows into the detection space 300 of FIG. 28. Thus, there is no scattered light based on emission light emitted from the light emitting portion 71, and the light receiving portion 72 does not receive scattered light. In this case, the sensor 100 does not detect a fire.

In addition, since the gas having a relatively high temperature is not supplied to the detection element 700, the temperature detected by the detection element 700 is at a room temperature level. In this case, the sensor 100 does not detect a fire.

(Fire Detection Operation—when Fire is Detected)

On the other hand, for example, when a fire occurs in the monitoring area, gas containing smoke particles flows into the detection space 300 of FIG. 28. Therefore, the smoke particles are irradiated with light emitted from the light emitting portion 71 to generate a relatively large amount of scattered light, and the light receiving portion 72 receives the scattered light. In this case, the sensor 100 detects a fire. Note that details of the inflow of the gas into the sensor 100 will be described later.

In addition, for example, a relatively high-temperature gas is supplied to the detection elements 700, and the temperature detected by at least one of the two detection elements 700 rises to a predetermined level. In this case, the sensor 100 detects a fire.

Note that the fire detection operation described herein is an example and is not limited. More specifically, the following operation may be performed.

For example, a fire may be detected when the light receiving portion 72 receives a relatively large amount of light and the temperature detected by the detection element 700 rises to a predetermined level. Alternatively, a fire may be detected when the temperature detected by the detection element 700 rises to a predetermined level, regardless of a light reception result of the light receiving portion 72.

(Inflow of Gas)

Next, the inflow of gas into the sensor 100 will be described.

FIGS. 30 and 31 are diagrams illustrating an inflow state of gas, and are diagrams illustrating an area corresponding to FIG. 29. Note that in FIGS. 30 and 31, flows of gas are indicated by white arrows. FIG. 30 illustrates the case where the gas is supplied toward the inside of the sensor 100 from a direction corresponding to the minor axis 230A of the protrusion 23 (minor axis of an ellipse which is a circumferential shape of the outer peripheral wall 231A in a front view). FIG. 31 illustrates the case where the gas is supplied toward the inside of the sensor 100 from a direction shifted from the minor axis 230A of the protrusion 23 by a predetermined angle.

First, in FIG. 1, due to occurrence of the fire, gas containing smoke particles is supplied to the sensor 100 along the ceiling surface 900 and flows into the outer cover 1 through the inlet 14 of the outer cover 1.

Next, a part of the introduced gas is guided along the outer peripheral wall 231A (FIG. 29) of the stepped portion 231 and supplied to the detection element 700. Note that, in this case, a part of the gas is guided by the side end portion 151A of the plurality of walls 151 in the suppressor 15 disposed on the front side of the stepped portion 231 and supplied to the detection element 700.

Meanwhile, another part of the inflowed gas climbs over the stepped portion 231 and is guided and supplied to the inside from the outer peripheral side of the sensor 100 through the gap 152 (FIG. 29) between the plurality of walls 151 of the suppressor 15. Thereafter, the other part of the gas flows into the detection space 300 through the first opening 21 of the inner cover 2 and the opening 31 of the smoke detector cover 3 while coming into contact with the first wall 161, the second wall 162, and/or the third wall 163 of the suppressor 15. In this case, moisture contained in the other part of the gas comes into contact with the first wall 161, the second wall 162, and/or the third wall 163 of the suppressor 15, and water droplets generated by condensation thereafter adhere to the suppressor 15 and/or the top surface portion 12, so that the moisture can be suppressed from flowing into the detection space 300. Note that since the first opening 21 of the inner cover 2 is provided with the insect screen 61 (FIG. 6), the other part of the gas flows into the detection space 300 through the plurality of small holes (not illustrated) of the insect screen 61.

Here, as illustrated in FIG. 30, for example, when the other part of the gas is supplied toward the inside of the sensor 100 from a direction corresponding to the minor axis 230A, the other part of the gas is guided and supplied as indicated by white arrows of FIG. 30. In addition, as illustrated in FIG. 31, for example, when the other part of the gas is supplied toward the inside of the sensor 100 from a direction shifted from the minor axis 230A by a predetermined angle, the other part of the gas is guided and supplied as indicated by white arrows of FIG. 31.

Effect of Embodiment

As described above, according to the embodiment, since the inflow space 400 provided inside the sensor 100, the detection space 300 for detecting the detection target and provided at a position on the ceiling surface 900 side of the inflow space 400 on the inside of the sensor 100, the inner cover 2 for housing the detection space 300 and capable of allowing gas containing the detection target to flow into and out of the detection space 300 through the inflow space 400, the outer cover 1 for housing the inner cover 2 and capable of allowing gas to flow into and out of the inflow space 400, and the suppressor provided in the inflow space 400, formed integrally with the outer cover 1, and for suppressing inflow of moisture contained in gas into the detection space 300 are provided, it is possible to effectively suppress inflow of moisture into the detection space 300 by the suppressor 15 provided in the inflow space 400 different in height position from the detection space 300, and to improve the moisture resistance of the sensor 100. In addition, when compared to the case where the suppressor 15 is provided separately from the outer cover 1, the attaching property of the suppressor 15 can be improved. Furthermore, when the size of the outer cover 1 is larger than that of another member, the heat capacity of the suppressor 15 can be increased, and thus the moisture permeation prevention property of the sensor 100 can be enhanced.

In addition, since at least a part of the top surface portion 12 is formed in an inclined shape so that, when water droplets generated by the suppressor 15 condensing moisture adhere to the top surface portion 12, the water droplets can flow down from the top surface portion 12, it is possible to suppress accumulation of the water droplets on the top surface portion 12, and to avoid impairment of the function of the sensor 100 due to the water droplets.

In addition, since the plurality of walls 151 includes the first wall 161 where at least some of the plurality of walls 151 intersect in a substantially cross shape at least in the central portion of the inflow space 400, it is possible to ensure the flow path for allowing the detection target to flow into the detection space 300 from the outside of the apparatus in the inflow space 400, and to enhance stability during attachment of the suppressor 15. In addition, the first wall 161 can increase the heat capacity of the suppressor 15, suppress permeation of moisture in the central portion of the inflow space 400, and further enhance the moisture permeation prevention property.

Modifications to Embodiment

Even though the embodiments according to the invention have been described above, the specific configuration and units of the invention may be modified and improved in any manner within the scope of the technical ideas of each invention described in the claims. Such modifications will be described below.

(With Regard to Problem to be Solved and Effect of Invention)

First, the problem to be solved by the invention and the effect of the invention are not limited to the above-described content, and the invention may solve a problem not described above or achieve an effect not described above. In addition, the invention may solve a part of the problem described above or achieve a part of the effect described above.

(With Regard to Sensor)

In the embodiment, the sensor has been described as including the detection element 700 and the second opening 22. However, the invention is not limited thereto. For example, the detection element 700 and the second opening 22 may be omitted.

(With Regard to Suppressor)

In the embodiment, the case where the suppressor 15 of FIG. 8 is provided on the outer cover 1 has been described. However, the invention is not limited thereto. For example, the suppressor 15 may be provided on the inner cover 2. Specifically, the suppressor 15 may be formed integrally with the inner cover 2, or the separately formed suppressor 15 may be fixed to the inner cover 2 using an adhesive, etc.

In addition, in the embodiment, the suppressor 15 has been described as being formed integrally with the top surface portion 12 of the outer cover 1. However, the invention is not limited thereto. For example, at least a part of the suppressor 15 may be formed integrally with the main body 11 of the outer cover 1.

Further, in the embodiment, the suppressor 15 has been described as including the first wall 161, the second wall 162, and the third wall 163. However, the invention is not limited thereto. For example, the suppressor 15 may have only one or two of the first wall 161, the second wall 162, or the third wall 163.

Further, in the embodiment, each of the first intersection wall 161a, the second intersection wall 161b, the third intersection wall 161c, and the fourth intersection wall 161d of the first wall 161 has been described as being formed to have the substantially curved shape in the front view. However, the invention is not limited thereto. For example, at least some of the first intersection wall 161a, the second intersection wall 161*b*, the third intersection wall 161*c*, and the fourth intersection wall 161*d* of the first wall 161 may be formed to have a linear shape in the front view.

Further, in the embodiment, the second wall 162 has been described as being formed to have the substantially curved shape in the front view. However, the invention is not limited thereto. For example, the second wall 162 may be formed to have a linear shape in the front view.

Further, in the embodiment, at least some of the plurality of walls 151 have been described as being disposed in the radial shape from the central portion of the inflow space 400 toward the outside. However, the invention is not limited thereto. For example, all the plurality of walls 151 may be disposed in the radial shape from the central portion of the inflow space 400 toward the outside. Alternatively, all the plurality of walls 151 may be disposed in a non-radial shape from the central portion of the inflow space 400 toward the outside (for example, all the plurality of walls 151 may be arranged in parallel to mutually have an interval therebetween in a direction along the X-axis (or Y-axis)).

Further, in the embodiment, the plurality of inlets 14 and the plurality of walls 151 have been described as being configured so that a relative arrangement relationship between an inlet 14 and a wall 151 corresponding to the inlet 14 is the same for the plurality of inlets 14. However, the invention is not limited thereto. For example, the plurality of inlets 14 and the plurality of walls 151 may be configured so that the relative arrangement relationship is different for the plurality of inlets 14. In this case, for example, the installation number of walls 151 may be set so as not to be an integral multiple of the installation number of inlets 14. In addition, the length of the gap between adjacent walls 151 among the plurality of walls 151 may be set to be non-uniform, or the length of the width of each of the plurality of inlets 14 may be set to be non-uniform.

(With Regard to Top Surface Portion)

In the embodiment, the top surface portion 12 has been described as being formed of a substantially circular flat plate-shaped body and provided substantially horizontally. However, the invention is not limited thereto. For example, at least a part of the top surface portion 12 may be formed in an inclined shape so that, when water droplets generated by the suppressor 15 condensing moisture adhere to the top surface portion 12, the water droplets can flow down from the top surface portion 12.

As an example, the entire top surface portion 12 may be formed of a substantially circular flat plate-shaped body, and the top surface portion 12 may be provided so as to be inclined with respect to the horizontal direction. Alternatively, only a part of the top surface portion 12 (for example, a portion other than an outer edge of the top surface portion 12 and the vicinity thereof) may be formed in an inclined shape, and the top surface portion 12 may be provided substantially horizontally.

In this way, it is possible to suppress accumulation of the water droplets on the top surface portion 12, and to avoid impairment of the function of the sensor 100 due to the water droplets.

(With Regard to Outer Peripheral Wall)

In the embodiment, a description has been given of the case where the outer peripheral wall 231A has an elliptical circumferential shape in the front view, that is, the protrusion 23 has the elliptical shape in the front view. However, the invention is not limited thereto. For example, the outer peripheral wall 231A may be configured so that the peripheral shape is an oval other than a perfect circle in the front view. When this configuration is adopted as well, it is possible to suppress variation in the temperature of the gas detected by the detection element 700 based on the direction in which the gas is supplied.

(With Regard to Combination)

The features of the embodiment and the features of the modifications may be combined in any manner.

One aspect of the present invention provides a fire detection apparatus attached to a predetermined installation surface to detect a fire in a monitoring area, the fire detection apparatus comprises: an inflow space provided inside the fire detection apparatus, gas outside the fire detection apparatus being allowed to flow into the inflow space; a detection space for detecting a detection target, the detection space being provided at a position on an installation surface side of the inflow space on the inside of the fire detection apparatus; an inner housing section for housing the detection space, the inner housing section being capable of allowing the gas containing the detection target to flow into and out of the detection space through the inflow space; an outer housing section for housing the inner housing section, the outer housing section being capable of allowing the gas to flow into and out of the inflow space; and a suppression section provided in the inflow space and formed integrally with the outer housing section, the suppression section being used to suppress inflow of moisture contained in the gas into the detection space.

According to this embodiment, since the inflow space provided inside the fire detection apparatus; the detection space for detecting a detection target and provided at a position on an installation surface side of the inflow space on the inside of the fire detection apparatus; the inner housing section for housing the detection space and capable of allowing the gas containing the detection target to flow into and out of the detection space through the inflow space; the outer housing section for housing the inner housing section and capable of allowing the gas to flow into and out of the inflow space; and the suppression section provided in the inflow space, formed integrally with the outer housing section, and for suppressing inflow of moisture contained in the gas into the detection space are provided, it is possible to effectively suppress inflow of moisture into the detection space by the suppression section provided in the inflow space different in height position from the detection space, and to improve the moisture resistance of the fire detection apparatus. In addition, when compared to the case where the suppression section is provided separately from the outer housing section, the attaching property of the suppression section can be improved. Furthermore, when the size of the outer housing section is larger than that of another member, the heat capacity of the suppression section can be increased, and thus the moisture permeation prevention property of the fire detection apparatus can be enhanced.

Another embodiment of the present invention provides the fire detection apparatus according to the above embodiment, wherein the outer housing section includes an outer housing section main body having a substantially hollow body shape, and a top surface portion having a substantially plate shape, the top surface portion being located on an opposite side from an installation surface side with respect to the outer housing section main body and the inflow space, and the suppression section is formed integrally with the top surface portion.

According to this embodiment, since the suppression section is formed integrally with the top surface portion, when compared to the case where the suppression section is formed integrally with the main body of the outer housing section, the suppression section and the outer housing section can be more easily configured, and productivity of the suppression section and the outer housing section can be improved.

Another embodiment of the present invention provides the fire detection apparatus according to the above embodiment, wherein at least a part of the top surface portion is formed in an inclined shape so that, when water droplets generated by the suppression section condensing the moisture adhere to the top surface portion, the water droplets are allowed to flow down from the top surface portion.

According to this embodiment, since at least a part of the top surface portion is formed in an inclined shape so that, when water droplets generated by the suppression section condensing the moisture adhere to the top surface portion, the water droplets are allowed to flow down from the top surface portion, it is possible to suppress accumulation of the water droplets on the top surface portion, and to avoid impairment of the function of the fire detection apparatus due to the water droplets.

Another embodiment of the present invention provides the fire detection apparatus according to the above embodiment, wherein: the suppression section includes a plurality of walls provided to partition the inflow space; and the plurality of walls includes an intersection wall in which at least some of the plurality of walls intersect in a substantially cross shape at least in a central portion of the inflow space.

According to this embodiment, the plurality of walls includes an intersection wall in which at least some of the plurality of walls intersect in a substantially cross shape at least in a central portion of the inflow space, it is possible to ensure the flow path for allowing the detection target to flow into the detection space from the outside of the apparatus in the inflow space, and to enhance stability during attachment of the suppression section. In addition, the intersection wall can increase the heat capacity of the suppression section, suppress permeation of moisture in the central portion of the inflow space, and further enhance the moisture permeation prevention property.

REFERENCE SIGNS LIST

1 Outer cover
2 Inner cover
3 Smoke detector cover
5 Smoke detector base
11 Main body
12 Top surface portion
13 Connecting portion
14 Inlet
15 Suppressor
16 Light guide opening
21 First opening
22 Second opening
23 Protrusion
24 Light guide opening
31 Opening
32 Light emitting-side housing
33 Light receiving-side housing
51 Light emitting-side housing
52 Light receiving-side housing
61 Insect screen
62 Board
63 Terminal board
64 Engaging metal fitting
71 Light emitting portion
72 Light receiving portion
73 Light guide
100 Sensor
151 Wall
151A Side end portion
152 Gap
161 First wall
161a First intersection wall
161b Second intersection wall
161c Third intersection wall
161d Fourth intersection wall
162 Second wall
163 Third wall
200 Base portion
230 Major axis
230A Minor axis
231 Stepped portion
231A Outer peripheral wall
300 Detection space
400 Inflow space
700 Detection element
711 Light emitting element
712 Light emitting-side optical element
721 Light receiving element
722 Light receiving-side optical element
801 Reference line
802 Reference line
803 Reference line
804 Reference line
805 Reference line
806 Reference line
807 Reference line
808 Reference line
809 Reference line
810 Reference line
811 Reference line
812 Reference line
813 Reference line
814 Reference line
815 Reference line
816 Reference line
817 Reference line
818 Reference line
819 Reference line
900 Ceiling surface
901 Optical axis
902 Optical axis
S Space
S1 Space
S2 Space

The invention claimed is:

1. A fire detection apparatus attached to a predetermined installation surface to detect a fire in a monitoring area, the fire detection apparatus comprising: an inflow space provided inside the fire detection apparatus, gas outside the fire detection apparatus being allowed to flow into the inflow space; a detection space for detecting a detection target, the detection space being provided at a position on an installation surface side of the inflow space on the inside of the fire detection apparatus; an inner housing section for housing the detection space, the inner housing section being capable of allowing the gas containing the detection target to flow into and out of the detection space through the inflow space; an outer housing section for housing the inner housing section, the outer housing section being capable of allowing the gas to flow into and out of the inflow space; and a suppression section provided in the inflow space and formed integrally with the outer housing section, the suppression section being used to suppress inflow of moisture contained in the gas into the detection space, a heat detection element that detects heat of gas flowing into the inflow space, a part of the heat detection element being provided to a front side of the inner housing section, a light emitting section that emits emission light into the detection space, and a light receiving section that receives scattered light generated by emission light scattered by detection targets in the detection space, a smoke detector cover, and a smoke detector base, wherein the inner housing section is an inner cover that has a first opening that is an opening for allowing gas to flow into the detection space and allowing the gas to flow out from the inside of the detection space, the smoke detector cover covers the detection space, the light emitting section, and the light receiving section together with the smoke detector base and partitions the inside and outside of the detection space, the smoke detector cover has an opening that is an opening for allowing gas to flow into the detection space and allowing the gas to flow out from the inside of the detection space, the inner housing section includes a base portion and a protrusion protruding from the base portion toward the front side, the protrusion includes a stepped portion that protrudes and rises with respect to the base portion, the outer housing section includes an outer housing section main body having a substantially hollow body shape, and a top surface portion having a substantially plate shape, the top surface portion being located on an opposite side from an installation surface side with respect to the outer housing section main body and the inflow space, the inflow space is provided in a space between the top surface portion and the inner cover in an inner space of the outer cover, the suppression section includes a plurality of walls provided to partition the inflow space, and the plurality of walls suppress inflow of moisture contained in the gas into the detection space, the plurality of walls are disposed so that respective side end portions of the plurality of walls are along an outer periphery of the stepped portion, a part of the gas introduced from outside of the fire detection apparatus to inflow space is guided along an outer peripheral wall of the stepped portion and supplied to the heat detection element, and another part of the gas introduced from outside of the fire detection apparatus to inflow space is guided to climb over the stepped portion, guided and supplied to the inside from the outer peripheral side of the fire detection apparatus through a gap between the plurality of walls, and guided to the detection space through the first opening of the inner cover and the opening of the smoke detector cover while coming into contact with a first wall, a second wall, and/or a third wall of the suppression section.

2. The fire detection apparatus according to claim 1, wherein at least a part of the top surface portion is formed in an inclined shape so that, when water droplets generated by the suppression section condensing the moisture adhere to the top surface portion, the water droplets are allowed to flow down from the top surface portion.

3. The fire detection apparatus according to claim 1, wherein:
the plurality of walls includes an intersection wall in which at least some of the plurality of walls intersect in a substantially cross shape at least in a central portion of the inflow space.

* * * * *